US012693968B2

(12) United States Patent
Kim et al.

(10) Patent No.: US 12,693,968 B2
(45) Date of Patent: Jul. 28, 2026

(54) FLASH-BASED STORAGE DEVICE AND METHOD FOR FLASH MEMORY INTERCONNECTION BASED ON PACKET COMMUNICATION

(71) Applicant: KOREA ADVANCED INSTITUTE OF SCIENCE AND TECHNOLOGY, Daejeon (KR)

(72) Inventors: John Dongjun Kim, Daejeon (KR); Jiho Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/804,343

(22) Filed: Aug. 14, 2024

(65) Prior Publication Data

US 2025/0117323 A1     Apr. 10, 2025

(30) Foreign Application Priority Data

Aug. 17, 2023   (KR) ........................ 10-2023-0107541
Aug. 8, 2024   (KR) ........................ 10-2024-0106347

(51) Int. Cl.
*G06F 12/02*        (2006.01)

(52) U.S. Cl.
CPC ................................ *G06F 12/0246* (2013.01)

(58) Field of Classification Search
CPC ................................................ G06F 12/0246
USPC ........................................................ 710/100
See application file for complete search history.

(56) References Cited

U.S. PATENT DOCUMENTS

| | | | | |
|---|---|---|---|---|
| 11,249,652 B1* | 2/2022 | Kuzmin | .................. | G06F 3/061 |
| 2005/0120146 A1* | 6/2005 | Chen | ........................ | G06F 13/28 |
| | | | | 710/22 |
| 2005/0120163 A1* | 6/2005 | Chou | ..................... | G11C 16/10 |
| | | | | 711/103 |
| 2007/0233955 A1* | 10/2007 | Luo | ......................... | G06K 19/07 |
| | | | | 711/115 |
| 2008/0016269 A1* | 1/2008 | Chow | ................. | G06F 13/1684 |
| | | | | 711/103 |
| 2008/0320214 A1* | 12/2008 | Ma | .......................... | G06F 3/064 |
| | | | | 711/E12.008 |
| 2009/0021992 A1* | 1/2009 | Oh | ........................ | G11C 7/1078 |
| | | | | 365/189.14 |
| 2017/0116139 A1* | 4/2017 | Mcvay | ................. | G06F 13/1668 |
| 2022/0083266 A1* | 3/2022 | Prakash | ................ | G06F 3/0679 |

(Continued)

OTHER PUBLICATIONS

"KAIST develops SSD system semiconductor using network technology . . . 'World's first' achievement", ETNEWS (electronic newspaper), Sep. 28, 2022, 18 pages.

(Continued)

*Primary Examiner* — Christopher B Shin
(74) *Attorney, Agent, or Firm* — LEX IP MEISTER, PLLC

(57)        ABSTRACT
A flash-based storage device includes a flash memory device including a plurality of flash memory chips connected to a plurality of flash buses, and a storage device controller including a plurality of flash controllers connected to the plurality of flash buses. The plurality of flash buses form a channel supporting packet communication, and each flash controller is implemented to generate a control packet including a command or a data packet including a payload, and transmit packets to a target flash memory chip through the connected flash bus.

19 Claims, 19 Drawing Sheets

(56) References Cited

U.S. PATENT DOCUMENTS

2023/0385149 A1 * 11/2023 Benhammadi ......... G11C 16/08
2025/0217004 A1 * 7/2025 Sang ................... G06F 3/04815

OTHER PUBLICATIONS

Jiho Kim et al., "Networked SSD: Flash Memory Interconnection Network for High-Bandwidth SSD", 2022 55th IEEE/ACM International Symposium on Microarchitecture (MICRO), Chicago, IL, USA, 2022, pp. 388-403, doi: 10.1109/MICRO56248.2022.00038.
Shiqin Yan et al., "Tiny-Tail Flash: Near-Perfect Elimination of Garbage Collection Tail Latencies in NAND SSDs", 15th USENIX Conference on File and Storage Technologies, Santa Clara, CA, USA, Feb. 27-Mar. 2, 2017, pp. 15-28.
Arash Tavakkol et al., "Network-on-SSD: A Scalable and High-Performance Communication Design Paradigm for SSDs", IEEE Computer Architecture Letters, vol. 12, No. 1, Jan.-Jun. 2013.

* cited by examiner

FIG. 3

Control packet

Data packet

Baseline GC

Baseline spatial GC pnSSD spatial GC

FLASH-BASED STORAGE DEVICE AND METHOD FOR FLASH MEMORY INTERCONNECTION BASED ON PACKET COMMUNICATION

CROSS-REFERENCE TO RELATED APPLICATION

This application claims priority to and the benefit of Korean Patent Application No. 10-2023-0107541 filed in the Korean Intellectual Property Office on Aug. 17, 2023, and Korean Patent Application No. 10-2024-0106347 filed in the Korean Intellectual Property Office on Aug. 8, 2024, the entire contents of which are incorporated herein by reference.

BACKGROUND

(a) Field

The present disclosure relates to a flash-based storage device.

(b) Description of the Related Art

A bandwidth of a flash (e.g., NAND flash)-based storage device (e.g., solid-state drive (SSD)) is increasing due to the advancement of flash memory technology and the improvement of high-speed interface protocol. In order to support the high bandwidth of input/output (I/O) requests, the internal parallel processing of the SSD is utilized, and additional bandwidth may be used by executing commands in parallel on multi-plane using multi-plane commands. In addition, as the flash memory performance improves, the performance requirements for a flash translation layer (FTL) are also increasing as the number of I/O requests increases. In addition to the flash memory, system resources such as cores, DRAM, and system buses are also used a lot during I/O operations.

On the other hand, an increase rate of bandwidth of a flash channel (or bus) that transfers data from a flash memory is slow compared to the bandwidth of the flash memory. Since multiple flash memory chips are typically connected to a single flash bus, the flash bus causes greater bottlenecks in high-performance SSD. In addition, the interface between the latest flash controller and the flash memory chip uses dedicated wiring. Therefore, since a certain number of pins out of the total pins are allocated exclusively for data communication and the remaining pins are allocated exclusively for control signals, there is a limitation in that the overall available channel bandwidth is not fully used.

SUMMARY

The present disclosure attempts to provide a flash-based storage device and a method for flash memory interconnection based on packet communication.

The present disclosure relates to a packetized SSD (pSSD) supporting packet communication between a flash controller and a flash memory chip.

The present disclosure relates to a packetized network SSD (pnSSD) that provides flash-flash data movement through a two-dimensional (2D) bus topology that adds a vertical bus structure to a horizontal bus structure of a pSSD.

According to some embodiments, a flash-based storage device includes a flash memory device including a plurality of flash memory chips connected to a plurality of flash buses, and a storage device controller including a plurality of flash controllers connected to the plurality of flash buses. The plurality of flash buses form a channel supporting packet communication. Each flash controller is implemented to generate a control packet including a command or a data packet including a payload, and transmit packets to a target flash memory chip through the connected flash bus.

Each flash memory chip may include a packet-based interface configured to: identify the control packet or the data packet based on a header of a received packet, depacketize the control packet to generate a control signal with the command and transmit the control signal to an internal memory area, or extract the payload included in the data packet and transmit the extracted payload to the internal memory area.

The control packet may include at least one command, and a column address and a row address related to the command. The header of the control packet may include a packet type indicator, the number of column addresses, and the number of row addresses. The data packet may include a data payload. The header of the data packet may include a packet type indicator, a packet direction indicator, and a payload size.

Any of the plurality of flash controllers may transmit the control packet or the data packet to the target flash memory chip after exchanging a handshaking signal to initiate the packet communication with the target flash memory chip.

The handshaking signal may include a chip enable (CE) signal or a ready/busy (R/B) signal.

The plurality of flash memory chips may be connected through a two-dimensional bus structure of horizontal buses and vertical buses.

Each horizontal bus may be connected to a corresponding flash controller among the plurality of flash controllers to form a horizontal channel, and each vertical bus may be connected to one of the plurality of flash controllers to form a vertical channel.

A path may be generated for data movement between the flash memory chips through the vertical channel.

A specific flash controller among the plurality of flash controllers may apply a chip enable signal through the vertical bus connecting a source and a destination of the data movement among the plurality of flash memory chips to generate the path, and the specific flash controller may be a flash controller in charge of the vertical bus connecting the source and the destination.

The plurality of flash memory chips may be divided into a first group and a second group, such that while one of the first group and the second group performs garbage collection, the other group may service I/O requests.

According to some exemplary embodiments, a flash controller connected to a plurality of flash memory chips through a flash bus supporting packet communication includes: flash command control logic generating a control signal for controlling a target flash memory chip among the plurality of flash memory chips; packetization logic generating the control signal as a control packet or generating a data packet including a payload; and an interface transmitting packets to the target flash memory chip through the flash bus.

The control packet may include at least one command, and a column address and a row address related to the command, and a header of the control packet may include a packet type indicator, the number of column addresses, and the number of row addresses.

The data packet may include a data payload. The header of the data packet may include a packet type indicator, a packet direction indicator, and a payload size.

The flash bus may connect the flash controller and the plurality of flash memory chips through one horizontal bus or connect the flash controller and the plurality of flash memory chips through a two-dimensional bus structure including the one horizontal bus and at least one vertical bus.

According to some exemplary embodiments, a flash memory chip connected to a flash bus supporting packet communication includes: a memory area including a flash array; and a controller configured to receive a packet transmitted by a first flash controller through a horizontal bus, identify a control packet or a data packet based on a header of the received packet, depacketize the control packet to generate a control signal with a command and transmit the control signal to the memory area, or extract the payload included in the data packet and transmit the payload to the memory area.

The controller may be configured to identify the control packet based on a packet type indicator described in the header of the received packet, and generate a command included in the control packet as the control signal through signal timing logic that generates a timing sequence.

The controller may be configured to exchange a handshaking signal to start packet communication with the first flash controller.

The flash memory chip may further include data plane logic connected to the second flash controller and another flash memory chip through the vertical bus, and implemented to provide a data movement path with the other flash memory chip through the vertical bus.

The data plane logic may be configured to: receive a chip enable (CE) signal in a vertical channel formed through the vertical bus from the second flash controller, acquire page data of the other flash memory chip through the vertical channel, or transmit page data to the other flash memory chip through the vertical channel.

According to the present disclosure, it is possible to increase the substantial effective bandwidth of the flash channel through the packet communication between the flash controller and the flash memory chip.

According to the present disclosure, it is possible to increase the substantial effective bandwidth of the flash channel without introducing the additional signals (additional pins) or increasing the signaling speed.

According to the present disclosure, by separating the paths for performing the I/O requests and garbage collection to reduce the interference of the garbage collection on the I/O, it is possible to improve the overall performance.

According to the present disclosure, it is possible to increase the substantial effective bandwidth of the flash channel through the packet communication between the flash controller and the flash memory chip.

According to the present disclosure, it is possible to increase the substantial effective bandwidth of the flash channel without introducing the additional signals (additional pins) or increasing the signaling speed.

According to the present disclosure, by separating the paths for performing the I/O requests and garbage collection to reduce the interference of the garbage collection on the I/O, it is possible to improve the overall performance.

BRIEF DESCRIPTION OF THE DRAWINGS

FIG. 3 is an exemplary diagram for describing a signal-based interface.

DETAILED DESCRIPTION OF THE EMBODIMENTS

Figure 1:
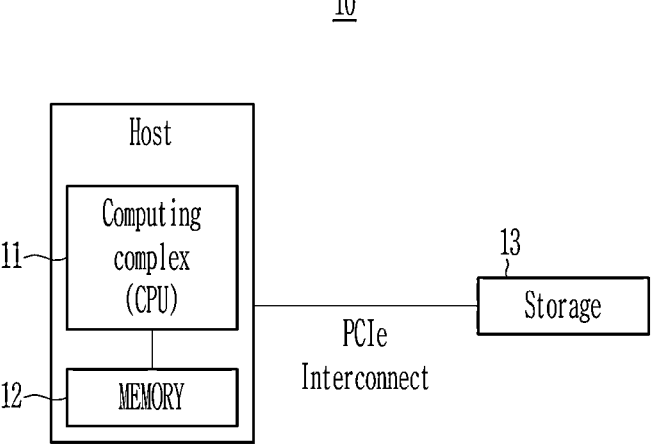
FIG. 1 is an exemplary diagram for describing a structure of a computing system according to an exemplary embodiment.

Hereinafter, exemplary embodiments of the present disclosure will be described in detail with reference to the accompanying drawings so that those skilled in the art to which the present disclosure pertains may easily practice the present disclosure. However, the present disclosure may be modified in various different forms, and is not limited to exemplary embodiments provided herein. In addition, components unrelated to a description will be omitted in the accompanying drawings in order to clearly describe the present disclosure, and similar reference numerals will be used to denote similar components throughout the present specification.

In the description, reference numerals and names are added for convenience of description, and the devices are not necessarily limited to the reference numerals or names.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, an expression written in singular may be construed in singular or plural unless an explicit expression such as "one" or "single" is used. Terms including an ordinal number such as first, second, etc., may be used to describe various components, but the components are not limited to these terms. The above terms are used solely for the purpose of distinguishing one component from another.

In flowcharts described with reference to the drawings, an order of operations may be changed, several operations may be merged, some operations may be divided, and specific operations may not be performed.

FIG. 1 is an exemplary diagram for describing a structure of a computing system according to an exemplary embodiment.

Referring to FIG. 1, a computing system 10 may include a computing complex 11, a memory 12, and a storage 13. The computing complex 11 may vary, for example, a central processing unit (CPU), a graphics processing unit (GPU), a microprocessor, or an application processor (AP), and in the description, the CPU will be described as an example.

The CPU 11 executes instructions to perform various operations (e.g., operations such as operations, logic, control, and input/output).

The memory 12 is system memory accessed and used by the CPU 11 and may include, for example, a dynamic random-access memory (DRAM). The CPU 11 and the memory 12 may be connected through a system bus. A system including the CPU 11 and the memory 12 may be referred to as a host, and the memory 12 may be referred to as host memory or system memory.

The storage 13 includes a storage medium and a controller. The storage 13 may be a flash-based storage device based on flash memory. For example, the storage 13 may be a solid state drive (SSD), a secure digital (SD) card, a universal serial bus (USB) flash drive, etc. In the exemplary embodiment below, the SSD, which is an example of a flash-based storage device, is described as a storage. In this case, the storage medium may include flash memory (e.g., NAND flash memory), and the controller may include an SSD controller.

The storage 13 may be connected to the host through the host interface. When a peripheral component interconnect express (PCIe) interface is used as the host interface, it may be called a PCIe storage.

Figure 2:
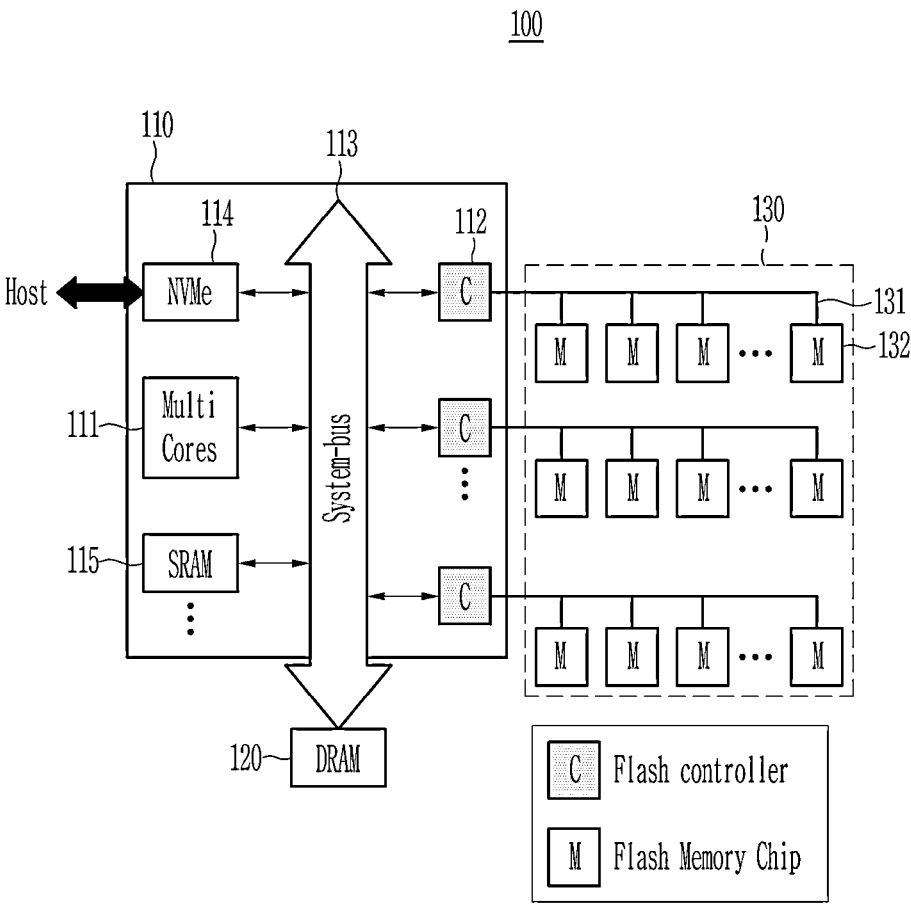
FIG. 2 is an exemplary block diagram of an SSD.
Figure 3:
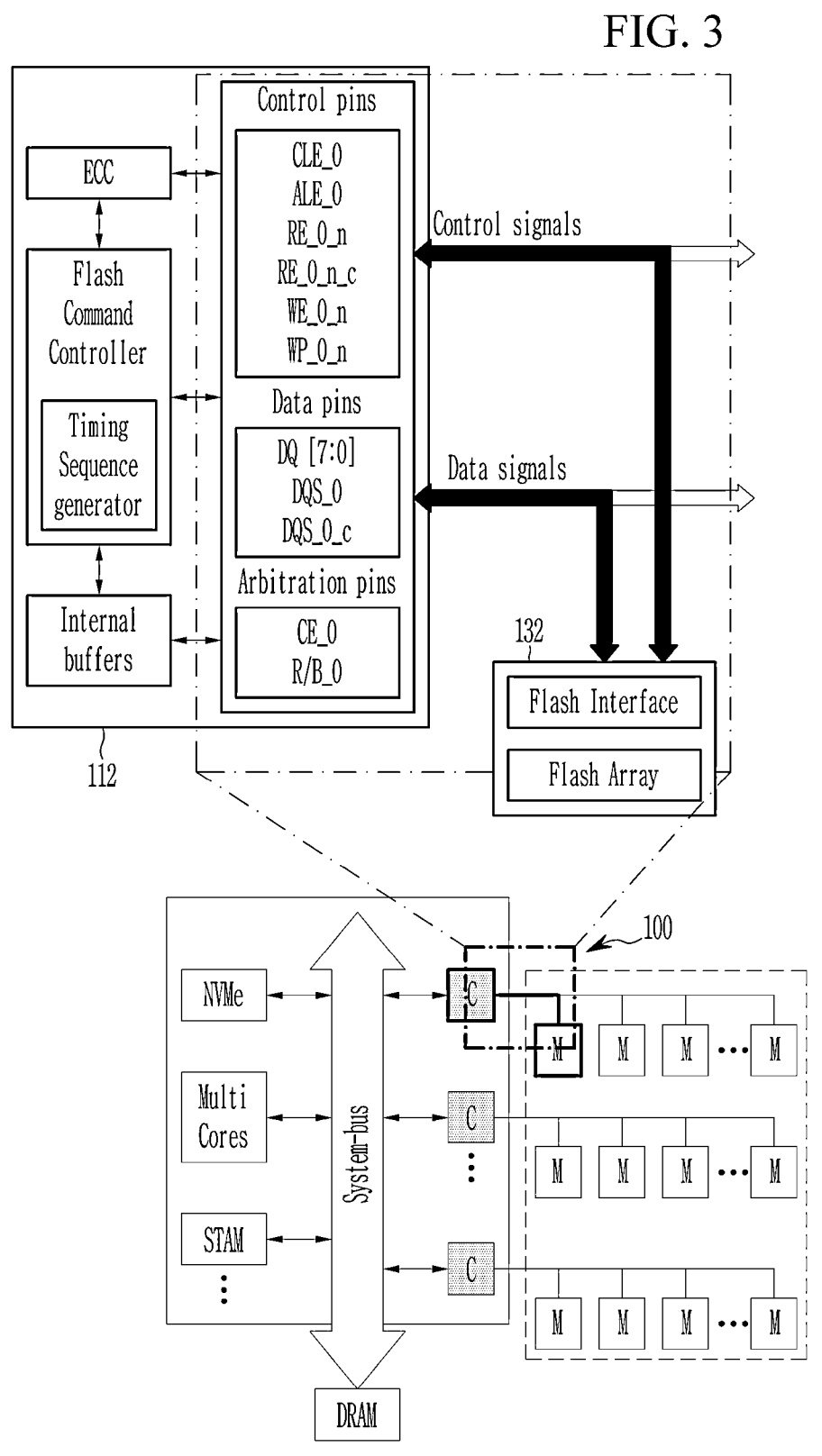

FIG. 2 is an exemplary block diagram of the SSD. FIG. 3 is an exemplary diagram for describing a signal-based interface.

Referring to FIG. 2, an SSD 100 includes an SSD controller 110, an internal memory 120, and a flash memory device 130.

The SSD controller 110 includes a processing core 111, a plurality of flash controllers 112, a system bus 113, a host interface 114, a static memory 115, etc. The processing core 111 may be implemented as a multi-core subsystem executing a flash translation layer (FTL). The flash controller 112 includes control logic such as error correction code (ECC) logic, internal buffers, and a timing sequence generator for each pin. The system bus 113 connects the processing core 111, the flash controller 112, the host interface 114, and the internal memory 120 to each other. The host interface 114 is an interface for connecting to the host and may be implemented as, for example, a non-volatile memory express (NVMe) interface. The static memory 115 may be, for example, static random access memory (SRAM).

The internal memory 120 may be, for example, dynamic random-access memory (DRAM).

The flash memory device 130 includes a plurality of flash buses 131 and a plurality of flash memory chips 132. Some of all the flash memory chips are connected to each flash bus 131.

A single flash controller 112 may be connected to the plurality of flash memory chips 132 through the flash bus 131. The flash bus 131 connecting the flash controller 112 and the flash and the flash memory chips 132 is a flash channel that transmits data or control signals, which may be called an interconnect structure.

In this way, the SSD 100 adopts multi-channel (or bus) architecture in which a plurality of flash memory chips are connected to a single flash bus. A bandwidth per chip may increase and more chips may be added to improve SSD performance. However, since the flash channel bandwidth increases at a slower rate than the flash memory bandwidth, the SSD performance cannot but be determined by the flash channel bandwidth. The flash channel bandwidth may increase by higher operating frequency or using additional pins, but there is a limit to the power consumption constraint and the number of pins that can be packaged.

In addition, the SSD 100 transmits data or control signals through a signal-based interface that transmits designated signals only through dedicated pins. Therefore, there is a limitation that the bandwidth of all the pins may not be sufficiently utilized.

Referring to FIG. 3, the flash controller 112 includes flash command controller logic including error correction code (ECC) logic, timing sequence generators for each pin, internal buffers, etc., and a plurality of pins for a communication interface with the flash memory chip 132 connected to the flash bus.

The flash controller 112 and the flash memory chip 132 may communicate through the signal-based interface. In the case of the signal-based interface, all the pins of the flash controller 112 are designated as control pins for control signals and data pins for data signals and used.

The flash memory chip 132 includes a flash interface and a flash array, and the flash interface is implemented as the signal-based interface.

For example, the flash interface uses 18 signals for communication, as shown in Table 1. 8 signals (DQ[7:0]) of the 18 signals are signals for data input/output, and the remaining signals are control signals. A DQS signal and a DQS_c signal are strobe signals for data, and the remaining signals are control signals that control a type of data or function (e.g., WP) transmitted through the DQ signal. For example, a command latch enable (CLE) signal is a signal notifying that the DQ signal contains command information. An address latch enable (ALE) signal, a read enable (RE) signal, and a write enable (WE) signal are signals for appropriately specifying a type of data transmitted through the DQ signal. The chip enable (CE) signal is a signal for the flash controller 112 to select the target flash memory chip 132. The ready/busy (R/B) signal is a signal for transmitting a state of the flash memory chip.

TABLE 1

| Symbols | Type | Description |
|---------|------|-------------|
| CLE | Control | Command Latch Enable |
| ALE | Control | Address Latch Enable |
| RE | Control | Read Enable |
| RE_c | Control | Read Enable Complement |
| WE | Control | Write Enable |
| WP | Control | Write Protection |
| CE | Control | Chip Enable |
| R/B_n | Control | Ready/Busy |
| DQ[7:0] | Data I/O | Data Input/Outputs |
| DQS | Data I/O | Data Strobe |
| DQS_c | Data I/O | Data Strobe complement |

The signal-based flash channel, in which these signals transmitted between the flash controller 112 and the flash memory chip 132 are transmitted only through dedicated pins, does not sufficiently utilize the bandwidth of all the pins.

The present disclosure for implementing a high-performance SSD by improving bandwidth (performance) through packet communication-based interconnection will be described below.

Figure 4:
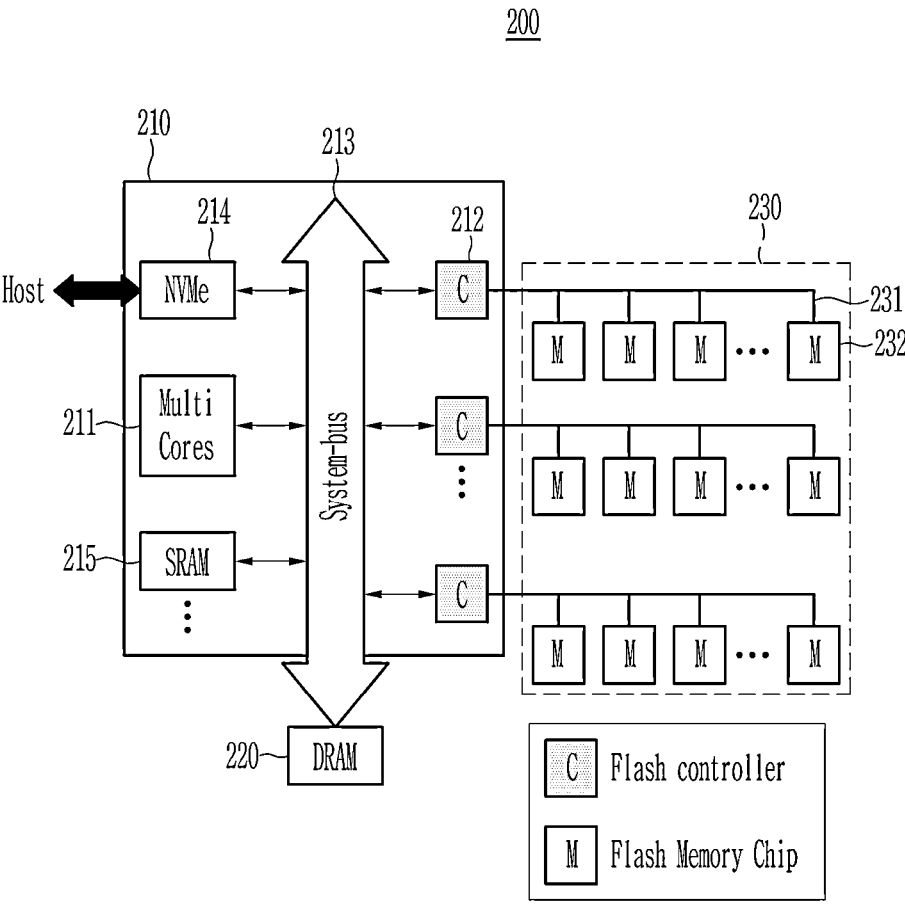
FIG. 4 is an exemplary block diagram of an SSD according to an exemplary embodiment.
Figure 5:
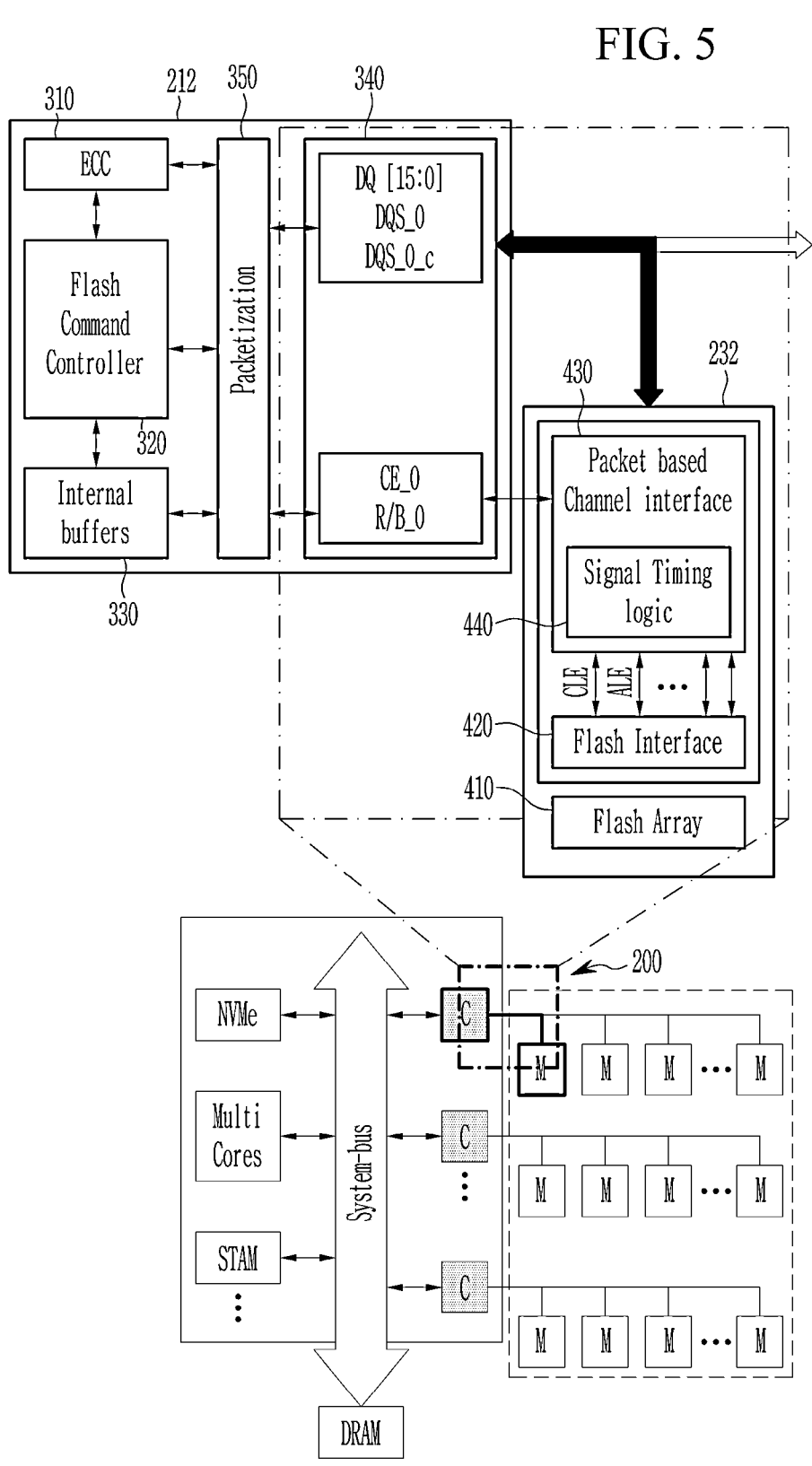
FIG. 5 is an exemplary diagram for describing a packet-based flash channel interface according to an exemplary embodiment.

FIG. 4 is an exemplary block diagram of the SSD according to an embodiment. FIG. 5 is an exemplary diagram for describing the packet-based flash channel interface according to an exemplary embodiment.

Referring to FIG. 4, an SSD 200 may include an SSD controller 210, an internal memory 220, and a flash memory device 230. The SSD 200 is a packetized SSD implemented to support packet communication in a flash channel, and may be referred to as pSSD in the description. The description of parts similar to the SSD 100 may be omitted in the following.

The SSD controller 210 may include a processing core 211, a plurality of flash controllers 212, a system bus 213, a host interface 214, a static memory (e.g., SRAM) 115, etc. The processing core 211, the flash controller 212, the host interface 214, and the internal memory (e.g., DRAM) 220 are connected to each other by the system bus 213.

The flash memory device 230 includes a plurality of flash buses 231 and a plurality of flash memory chips 232. Some of all the flash memory chips are connected to each flash bus 231.

The flash controller 212 and the plurality of flash memory chips 232 are connected through the flash bus 231 . . . . Here, the flash channel, which is a communication channel formed through the flash bus 231, is implemented as a packet-based interface rather than a dedicated signal-based interface. In the description, the terms flash bus and flash channel may be used interchangeably.

Referring to FIG. 5, the flash controller 212 may include error correction code (ECC) logic 310, flash command controller logic 320, internal buffer 330, communication interface 340 with the flash memory chip 232 connected to a flash bus, and a packetization logic 350 that converts a signal into a packet or a packet into a signal. The communication interface 340 is a packet-based interface that supports packet communication and may be called a packet-based channel interface. Here, the flash controller 212 may transmit a control signal or data by packetizing the control signal or data through the packetization logic 350 without having to allocate some of the plurality of pins of the communication interface 340 exclusively for control signals. The packet type may be distinguished by indicating a type indicating the control packet or a data packet in the packet header. For the control packet or the data packet, the control packet may include a command and an address, and the data packet may include page data.

The flash memory chip 232 includes a flash array 410, a flash interface 420, and may further include a packet-based channel interface 430 that supports packet communication. The packet-based channel interface 430 may receive the control packet or the data packet through the flash channel, and may depacketize the received packet to obtain an original signal (e.g., CLE, ALE, etc.) and transmit the original signal to the flash interface 420. Meanwhile, signal timing logic 440 that generates a timing sequence may be implemented in the flash memory chip 232 instead of the flash controller.

In the pSSD 200, the flash controller 212 and the flash memory chip 232 communicate through packets, but require a control signal to determine a subject that may access the flash bus before the communication. The flash controller 212 may enable communication with a specific chip using the chip enable (CE) signal. The flash controller 212 may check the state of the chip based on the ready/busy (R/B) signal transmitted from the specific chip. In other words, the chip enable CE signal and the ready/busy (R/B) signal may be used as handshaking signals.

This packetization allows the data and control signal to share pins. Therefore, when data is transmitted through 8 DQ[7:0] pins in the case of the signal-based interface, data may be transmitted through 16 DQ[15:0] pins in the case of the packet-based interface, so the effective bandwidth of the flash channel may be improved by approximately 2 times.

Figure 6:
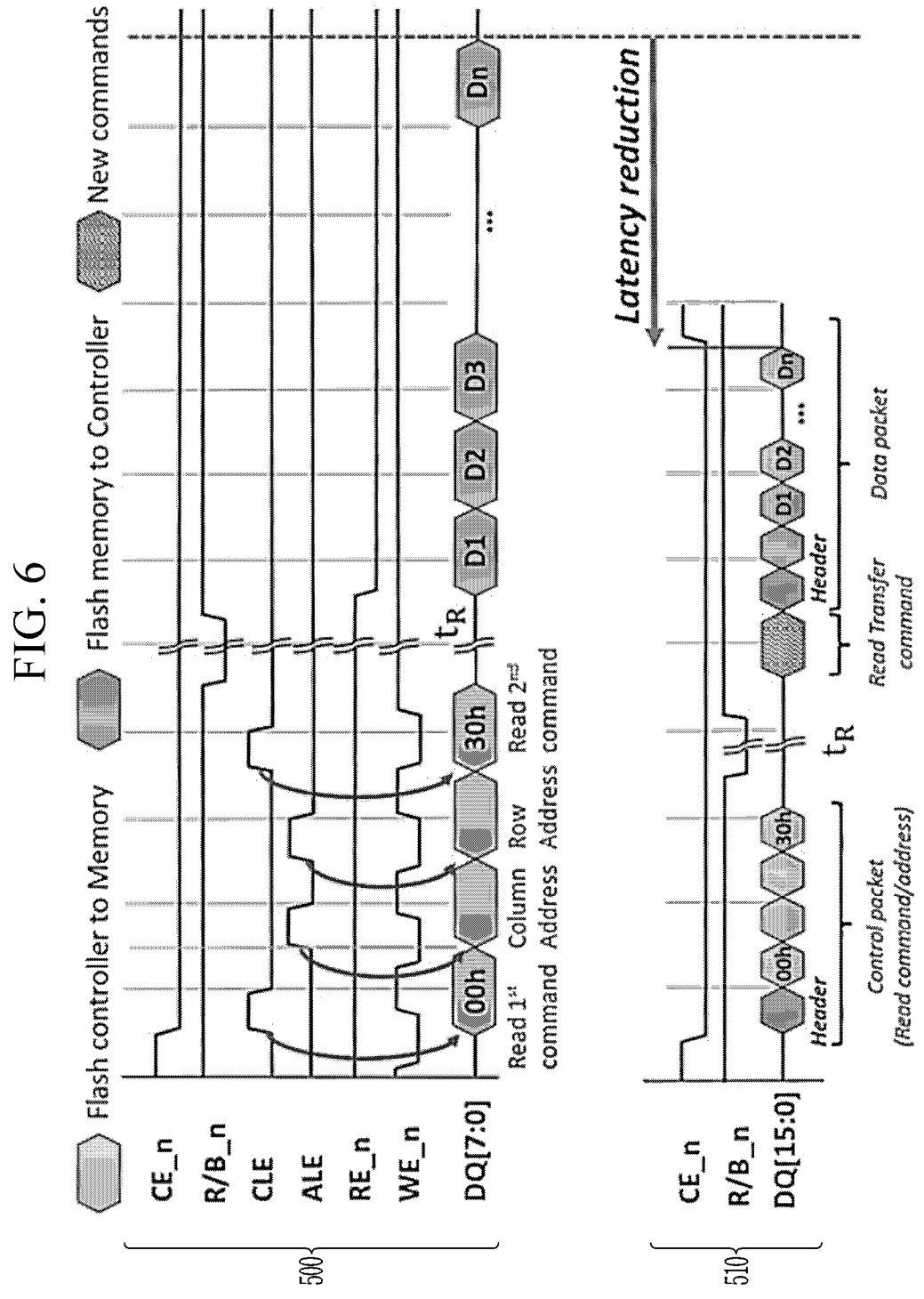
FIG. 6 is an exemplary timing diagram of an SSD having a signal-based interface and a pSSD having a packet-based interface.

FIG. 6 is an exemplary timing diagram of the SSD having the signal-based interface and the pSSD having the packet-based interface.

Referring to FIG. 6, a timing diagram 500 illustrates communication for a read operation in the SSD 100 having the signal-based interface. A timing diagram 510 illustrates communication for the same read operation in the pSSD 200 having the packet-based interface.

First, looking at the timing diagram 500, the flash controller 112 of the SSD 100 selects a target flash memory die for a page address to be accessed through a CE_n signal. The flash controller 112 issues a first read command (which may be configured as 00h for a first command and 30h for a second command) through DQ[7:0] while the CLE signal is applied, and transmits a column address and a row address while the ALE signal is applied, and issues a second read command. Thereafter, the target flash memory chip reads the page and stores the read page in an internal register $t_R$. The flash controller 112 reads the stored page through the flash channel for several cycles using a read enable signal RE_n.

Next, looking at the timing diagram 510, the flash controller 212 of the pSSD 200 applies a designated signal (e.g., CE_n signal) to enable the target flash memory chip to receive packets, and receives a designated signal (e.g., R/B signal) from the target flash memory chip to complete the handshaking procedure. Thereafter, the flash controller 212 transmits a control packet including both a read command (a first read command and a second read command) and an address (a column address and a row address) to the target flash memory chip. The target flash memory chip receives the control packet, reads the page according to the control signal included in the control packet, and stores the read page in the internal register $t_R$. When the read operation is completed, the target flash memory chip transmits data packets D1, D2, . . . including page data to the flash controller 212.

Meanwhile, the flash controller 112 of the SSD 100 uses the RE_n signal to read the page data, but the pSSD 200 may use a new command (read data transfer command) instead of the RE_n signal to cause the target flash memory chip to start transmitting the data packet including the page data.

Figure 7:
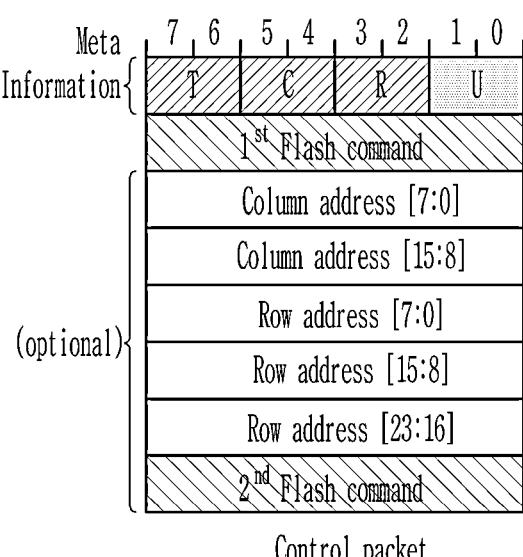
FIG. 7 is an exemplary diagram of a control packet and data packet structure according to an exemplary embodiment.

FIG. 7 is an exemplary diagram of a control packet and data packet structure according to an exemplary embodiment.

Referring to FIG. 7, the control packet used in the pSSD 200 includes a command and an address. For example, in the case of the communication through an 8-bit signal, one flit is 8 bits, and one packet may be composed of a plurality of flits.

The control packet includes at least one flash command and may further include addresses (column address and row address). The header of the control packet includes meta information, and the meta information may include a packet type indicator (type, T), the number C of column addresses, and the number R of row addresses. For example, when the packet type indicator T is represented by 2 bits, 00 may indicate a data packet, 01 may indicate a first control packet, and 10 may indicate a second control packet.

The data packet includes a data payload and may be a multi-flit packet. The header of the data packet may include a packet type indicator (e.g., 00) indicating that it is a data packet, a packet direction indicator (direction, D), a unit of payload size, and a payload size. For example, when the packet direction indicator D is represented by 1 bit, 0 may indicate a packet whose destination is flash memory, and 1 may indicate a packet whose source is flash memory. For example, when the unit of the payload size is represented by 1 bit, 0 may indicate a byte and 1 may indicate a kilobyte.

A length of the control packet and the data packet is variable, and an on-die controller in the flash memory may detect the packet length using the header information. The on-die controller is described in detail with reference to FIG. 15.

The control packet and the data packet include a packet header having the same size as the flit, but the control packet header uses only 6 bits out of 8 bits, and the data packet header uses only 4 bits out of 8 bits. Therefore, when using the packet-based interface, packet overhead occurs, which may be considered to be a small level compared to the packet size.

A method for implementing a direct connection (flash-flash connection) between flash memory chips through a 2D bus topology that extends the bus architecture of the SSD into two dimensions will be described below.

Figure 8:
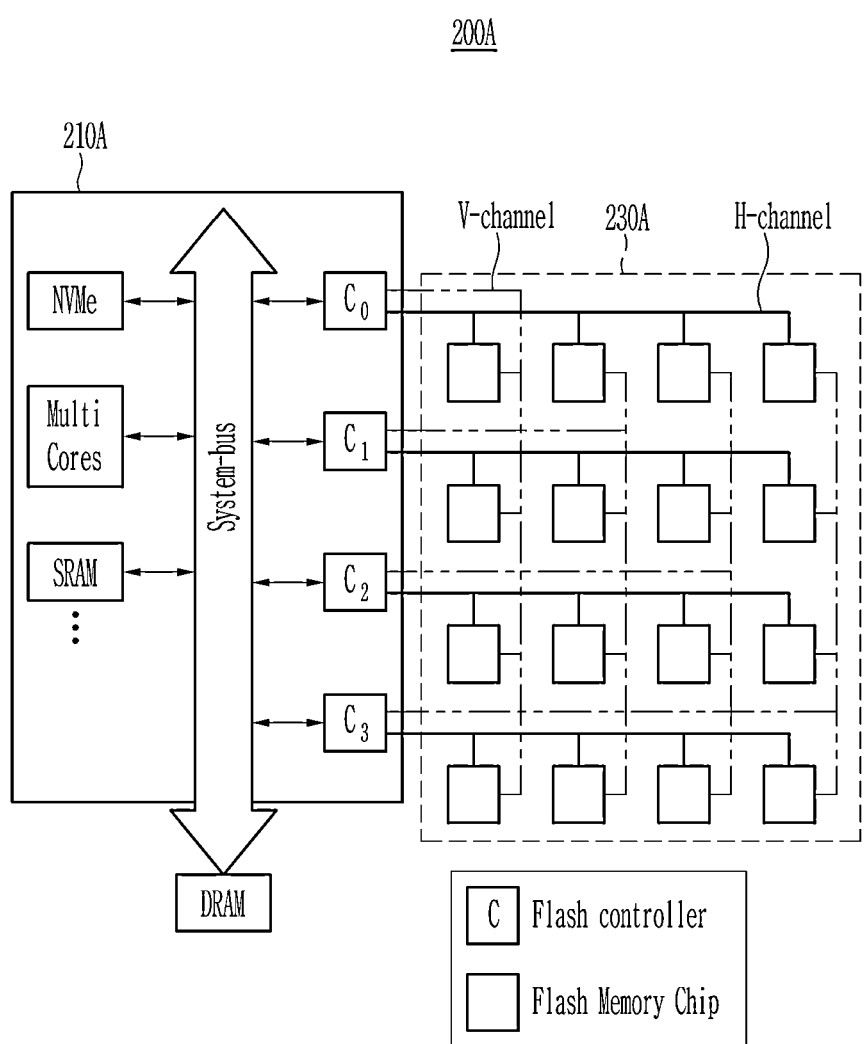
FIG. 8 is a diagram for describing a flash memory interconnect structure according to an exemplary embodiment.
Figure 9A:
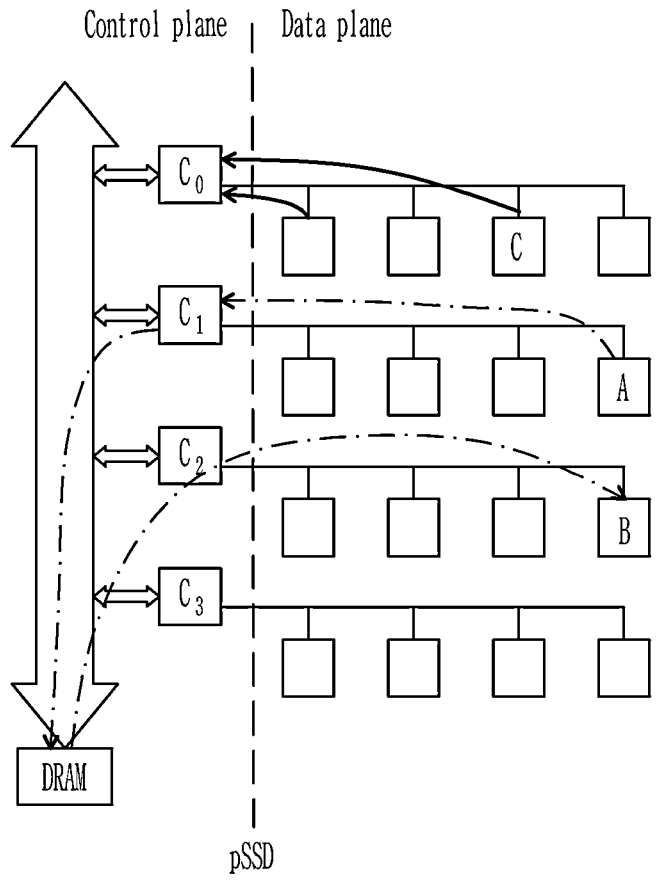
FIGS. 9A and 9B are diagrams for describing flash memory data movement according to an exemplary embodiment.
Figure 9B:
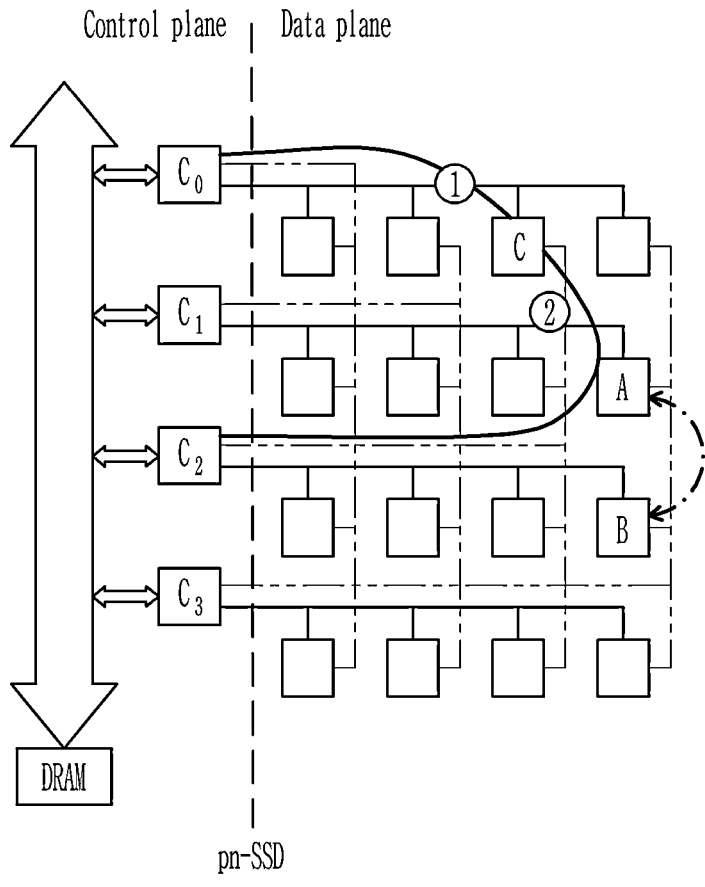
Figure 10:
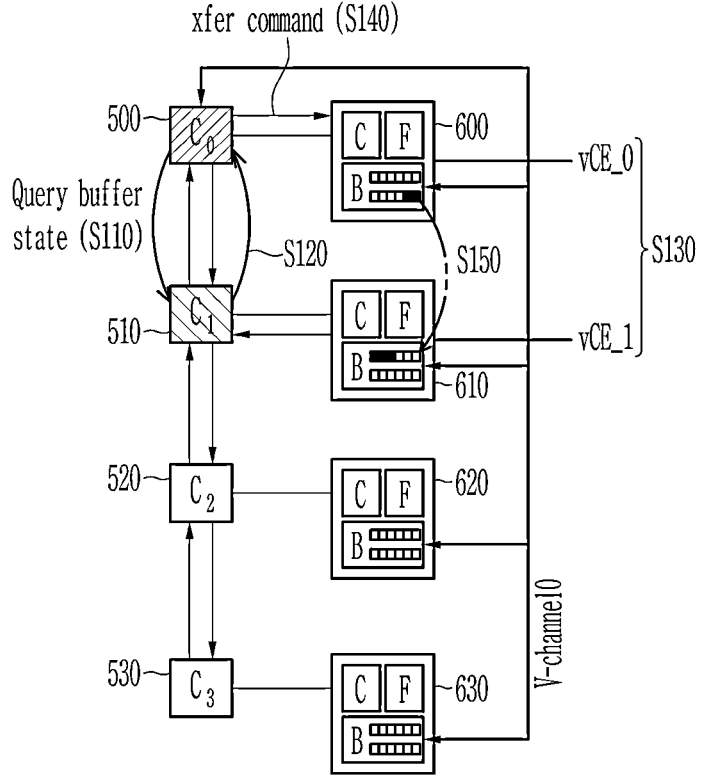
FIGS. 10 to 12 are exemplary diagrams for describing an operation of a flash controller in a pnSSD according to an exemplary embodiment.
Figure 10:
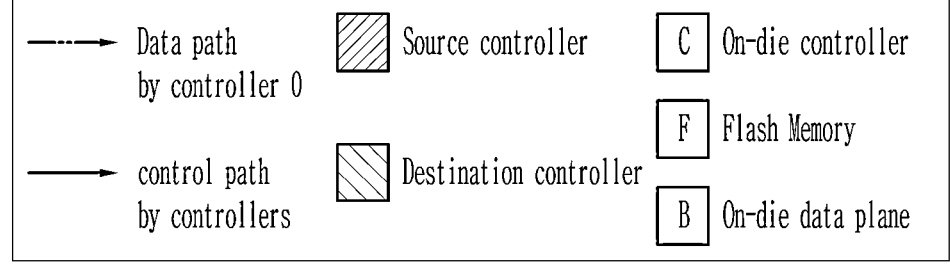
Figure 11:
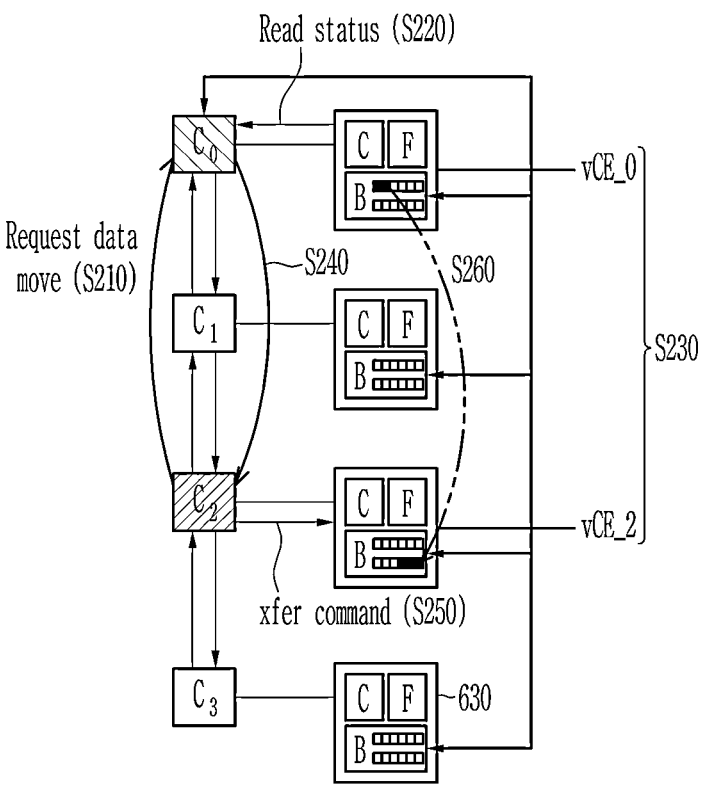
Figure 11:
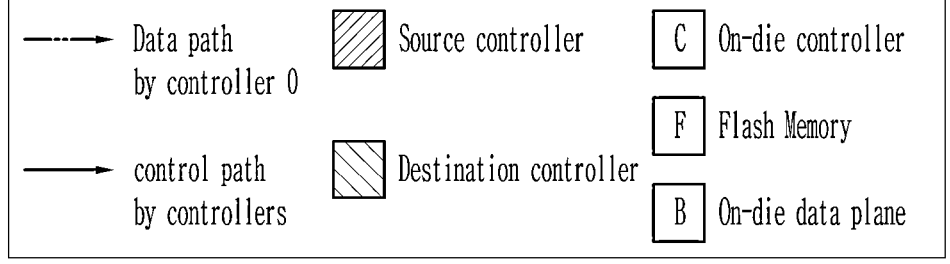
Figure 12:
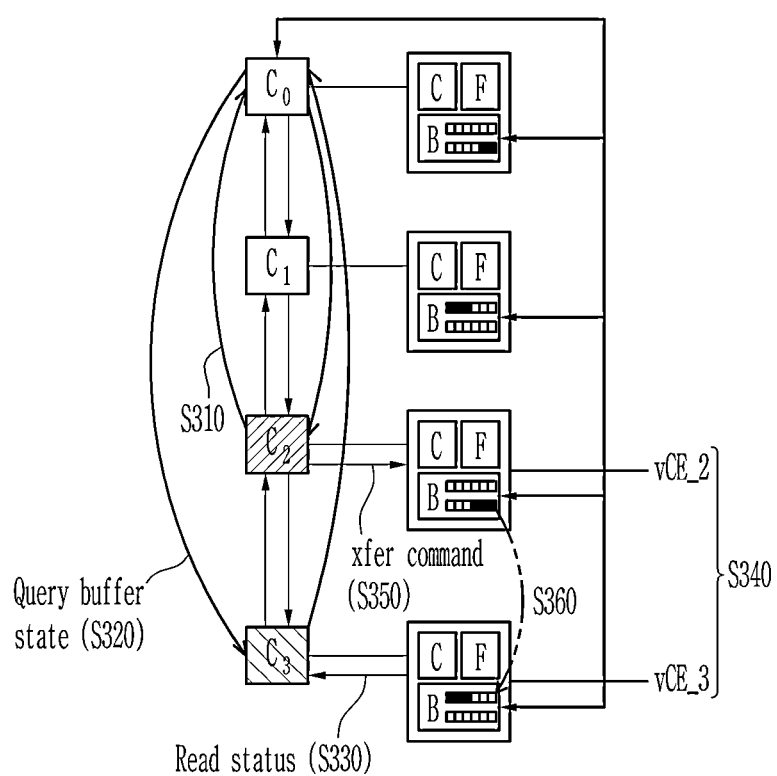
Figure 12:
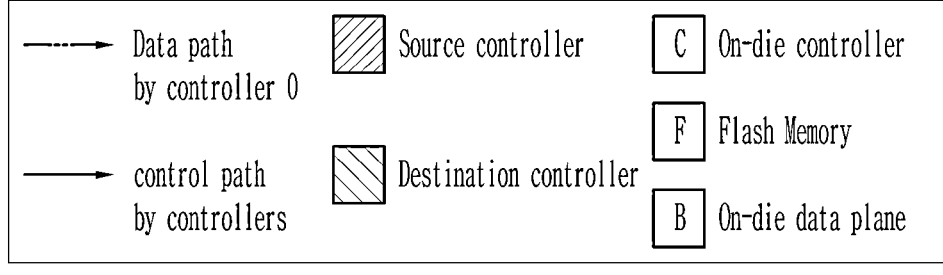

FIG. 8 is a diagram for describing a flash memory interconnect structure according to an exemplary embodiment. FIGS. 9A and 9B are diagrams for describing flash memory data movement according to an exemplary embodiment. FIGS. 10 to 12 are exemplary diagrams for describing an operation of a flash controller in a pnSSD according to an exemplary embodiment.

Referring to FIG. 8, the flash memory chips of the pSSD 200 may be connected not only horizontally but also vertically. The SSD providing such an interconnect structure may be called a packetized network SSD (pnSSD) 200A, for convenience. This interconnect structure may be called a two-dimensional bus structure or an omnibus network structure. Description of the same parts as the pSSD will be omitted.

A flash memory device 230A of a pnSSD 200A includes a plurality of flash buses and a plurality of flash memory chips, and some of all the flash memory chips are interconnected. In this case, the flash memory chips of the flash memory device 230A may be interconnected not only through the horizontal channel but also through the vertical channel. That is, the flash memory device 230A may configure a network in which all the flash memory chips in the same row are interconnected and all the flash memory chips in the same column are interconnected.

The pnSSD 200A enables the direct connection (flash-flash connection) between the flash memory chips. In particular, it is possible to potentially separate internal and external traffic within the pnSSD 200A. When the source and destination of the communication remain within the SSD (e.g., copy operation used during garbage collection), it is defined as internal traffic, and when only one of the source and destination remains within the SSD (e.g., an I/O operation such as a read or write operation), it may be defined as external traffic. The pnSSD 200A may handle these two types of traffic separately. For example, the pnSSD 200A may minimize an interference between the two traffics while simultaneously executing the I/O operations (external traffic) and the garbage collection (internal traffic). In addition, since a flash channel bandwidth utilization is different for each channel, the I/O requests on the channels may not be uniform, but the pnSSD 200A provides path diversity through the flash-flash connection, enabling load balancing that utilizes the plurality of channels uniformly.

The pnSSD 200A may build an omnibus topology that connects horizontal channels to each flash controller and also connects each vertical channel to a certain flash controller. That is, when the row and column sizes are the same, the flash controller is connected to one horizontal channel and one vertical channel, and may directly control the flash memory chips connected to the horizontal channel and the vertical channel. For example, the horizontal bus providing the horizontal channel may be connected to the DQ[7:0] pins, and the vertical bus providing the vertical channel may be connected to the DQ[15:8] pins.

The interconnection in the pnSSD may be expanded in various ways. For example, when the number of flash controllers and the number of chips connected to the horizontal channels of each flash controller are the same (i.e., the rows and columns are the same), each flash controller may be in charge of one vertical channel. When the number of chips (e.g. 8) connected to the horizontal channels of each flash controller is greater than the number (e.g., 4) of flash controllers, each flash controller may be in charge of two vertical channels. In this case, the vertical bus connected to the flash controller may interconnect two columns of chips connected to the horizontal bus. When the number (e.g., 4) of chips connected to the horizontal channels of each flash controller is less than the number (e.g., 8) of flash controllers, half of the flash controllers may be in charge of only one horizontal channel, and the other half of the flash controllers may be in charge of one horizontal channel and one vertical channel. In this way, the bus structure connecting the flash controller and the flash memory chips may be designed in various ways depending on the layout and size of the network to which the chips are connected.

Referring to FIG. 9, when a page of a flash memory chip A needs to be copied to a flash memory chip B, the data movement in the pSSD and pnSSD will be examined.

In the case of the pSSD of FIG. 9A, the page moves from the flash memory chip A to a flash controller $C_1$ and DRAM, and then copied from the DRMA to the flash memory chip B.

In the case of the pnSSD of FIG. 9B, since the flash memory chip A and the flash memory chip B are connected by the vertical channel, the page may be copied from the flash memory chip A to the flash memory chip B through the vertical channel.

When data needs to be read from a flash memory chip C, the pSSD may use only one horizontal bus as a data path, but the pnSSD may transmit the data of the flash memory chip C through the horizontal bus or route the data through the vertical bus.

The data movement in the pnSSD will be described with reference to FIGS. 10 to 12.

Referring to FIGS. 10 to 12, the network between the flash memory chips in the pnSSD may operate as a data plane for the flash-flash data movement. In addition, the flash controller of the pnSSD may operate as a control plane that controls the flash-flash data movement.

When the network is generated between the flash memory chips, each node (flash memory chip) of the network is mainly used for the data movement, and the control logic (e.g., arbitration, routing, etc.) for the data movement may be designed to be processed by the flash controller.

The flash controller is in charge of one vertical channel and should control the data plane, especially the connected vertical channel, for the flash-flash data movement. Here, the flash controller may perform three roles within the control plane.

For example, when a source node of the packet is connected to a horizontal channel (h-channel) of the flash controller, the flash controller may be called the source controller. When a destination node of the packet is connected to the horizontal channel of the flash controller, the flash controller may be called the destination controller. When the flash controller is not connected to a source node or a destination node in the horizontal channel and vertical channel that it is in charge of, it may be called an intermediate controller.

It is assumed that the SSD controller of the pnSSD includes a plurality of flash controllers $C_0$, $C_1$, $C_2$, and $C_3$ 500, 510, 520, and 530, and each flash controller manages the flash memory chips connected to the horizontal channel and the vertical channel. In the description, it is assumed that the flash controller $C_0$ 500 manages vertical channel 0 (v-channel 0), and a plurality of flash memory chips 600, 610, 620, and 630 are connected to the vertical channel 0. It is assumed that the flash memory chip 600 is connected to a horizontal channel of the flash controller $C_0$ 500, the flash memory chip 610 is connected to a horizontal channel of the flash controller $C_1$ 510, the flash memory chip 620 is connected to a horizontal channel of the flash controller $C_2$ 520, and the flash memory chip 630 is connected to a horizontal channel of the flash controller $C_3$ 530. Each flash memory chip includes a packet-based interface for packet processing, and the packet-based interface may be implemented as hardware logic for an on-die controller and an on-die data plane. The on-die controller may be implemented to interpret the packet header and generate the corresponding control signal and transmit the generated control signal to the flash memory. The on-die data plane may be implemented to act as a switch for flash-flash communication. The structures of the on-die controller and the on-die data plane are described in detail with reference to other drawings.

Referring to FIG. 10, it is assumed that the flash memory chip 600 is the source and the flash memory chip 610 is the destination. Then, the flash controller $C_0$ 500 becomes the source controller and the flash controller $C_1$ 510 becomes the destination controller.

First, the control plane operates with the source controller $C_0$ 500, so the source controller $C_0$ 500 transmits a request to the destination controller $C_1$ 510 (S110). Since the source controller $C_0$ 500 and the destination 610 are connected to the vertical channel that it is in charge of, the source controller $C_0$ 500 may transmit a request including a query buffer state of the destination 610 to the destination controller $C_1$ 510. The request may be transmitted through an on-chip network within an SoC controller.

The destination controller $C_1$ 510 reads the data plane buffer state of the destination 610, and when the buffer is available, the destination controller $C_1$ 510 transmits a grant to the source controller $C_0$ 500 (S120).

The source controller $C_0$ 500 applies chip enable CE signals vCE_0 and vCE_1 to the source 600 and the destination 610 through the connected vertical channel (S130). vCE_0 and vCE_1 may refer to the CE signals in the vertical channel.

The source controller $C_0$ 500 issues a page transfer (xfer) command to the source 600 for the flash-flash data movement (S140).

Then, the page moves from the source 600 to the destination 610 through the vertical channel (S150).

Referring to FIG. 11, it is assumed that the flash memory chip 600 is the source and the flash memory chip 610 is the destination. Then, the flash controller $C_2$ 520 becomes the source controller and the flash controller $C_0$ 500 becomes the destination controller.

First, since the destination 600 is not connected to the vertical channel that it is in charge of, the source controller $C_2$ 520 transmits a request to the destination controller $C_0$ 500 in charge of the vertical channel to which the source 620 and the destination 600 are connected (S210). The request may be request data move from the source 620 to the destination 600.

The destination controller $C_0$ 500 reads the data plane buffer state of the destination 600 (S220).

When the buffer is available, the destination controller $C_0$ 500 applies chip enable CE signals vCE_2 and vCE_0 to the source 620 and the destination 600 through the connected vertical channel (S230).

The source controller $C_2$ 520 receives a response from the destination controller $C_0$ 500 that the chip enable signal has been applied (S240), and issues a page transfer (xfer) command for flash-flash data movement to the source 620 (S250).

Then, the page moves from the source 620 to the destination 600 through the vertical channel (S260).

Referring to FIG. 12, it is assumed that the flash memory chip 620 is the source and the flash memory chip 630 is the destination. Then, the flash controller $C_2$ 520 becomes the source controller and the flash controller $C_3$ 530 becomes the destination controller. Here, the vertical channel connected between the source 620 and the destination 630 is handled by the flash controller $C_0$ 500. In this case, the flash controller $C_0$ 500 plays the role of the intermediate controller. In the control plane, the request starts at the source controller $C_2$ 520 and passes through the intermediate controller $C_0$ 500 before reaching the destination controller $C_3$ 530, and as a result, the source 620 and destination 630 connected by the network may be properly enabled.

Since the destination 630 is not connected to the vertical channel that it is in charge of, the source controller $C_2$ 520 transmits a request to the intermediate controller $C_0$ 500, which is in charge of the vertical channel to which the source 620 and the destination 630 are connected (S210). The request may be the request data move from the source 620 to the destination 630.

The intermediate controller $C_0$ 500 transmits the query buffer state request to the destination controller $C_3$ 530 (S320).

The destination controller $C_3$ 530 reads the data plane buffer state of the destination 630, and when the buffer is available, transmits a grant to the intermediate controller $C_0$ 500 that requests the grant (S330).

The intermediate controller $C_0$ 500 applies chip enable CE signals vCE_2 and vCE_3 to the source 620 and the destination 630 through the connected vertical channel (S340).

After the chip enable signal by the intermediate controller $C_0$ 500 is applied, the source controller $C_2$ 520 issues the page transfer (xfer) command for moving the flash-flash data to the source 620 (S350).

Then, the page moves from the source 620 to the destination 630 through the vertical channel (S360).

In this way, the data plane of the pnSSD may be designed to provide path diversity, but always perform the minimum movement path routing. While the horizontal channel or the vertical channel may be utilized, the packet may not be held for the channel or the intermediate buffer. When the bus structure is a two-dimensional structure having horizontal dimension and vertical dimension, the routing algorithm may follow dimension-ordered routing in which the horizontal dimension is routed before the vertical dimension. Therefore, no circular dependency exists and routing deadlock may be prevented.

FIGS. 13, 14A, 14B, and 14C each are diagrams for describing spatial garbage collection according to an exemplary embodiment.

Figure 13:
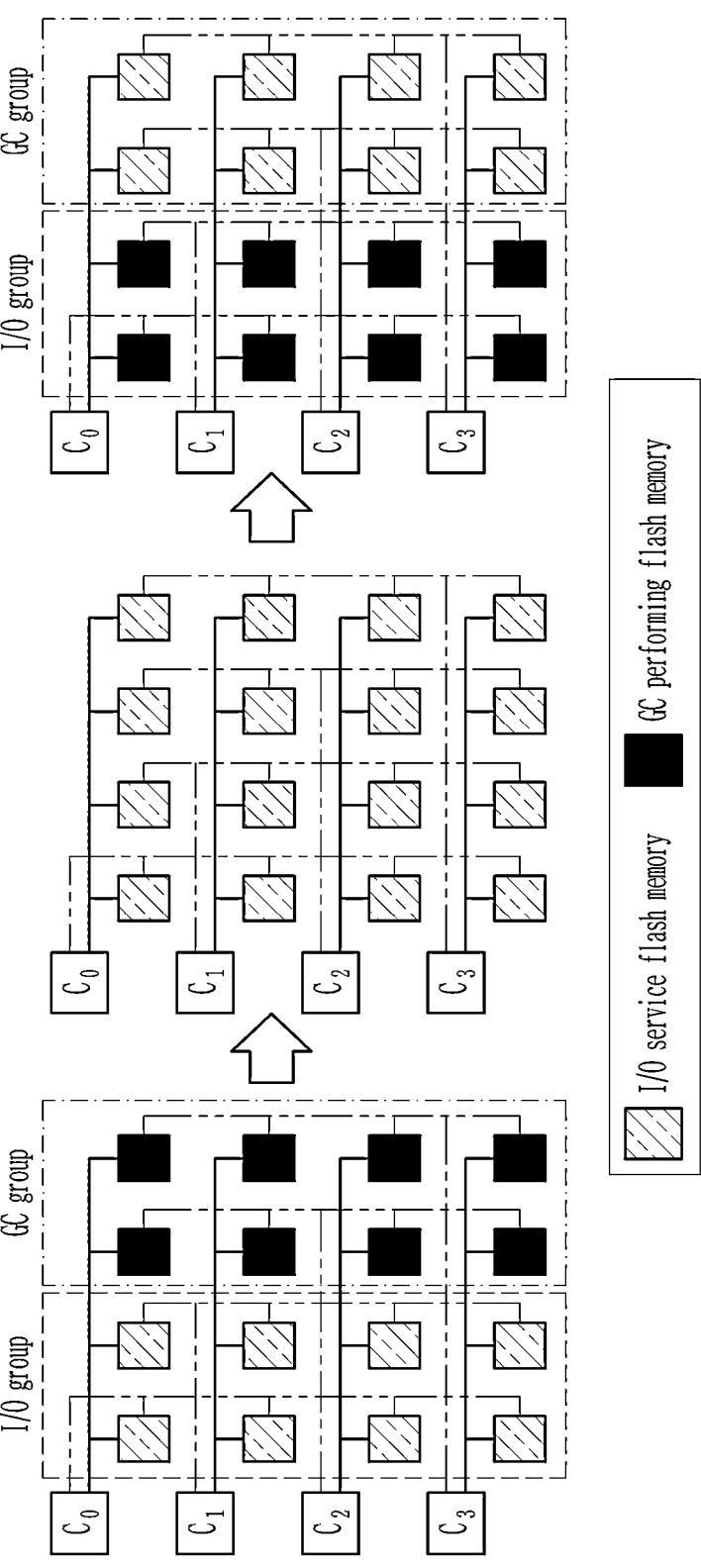
FIGS. 13, 14A, 14B, and 14C each are diagrams for describing spatial garbage collection according to an exemplary embodiment.

Referring to FIG. 13, the pnSSD 200A performs the garbage collection by utilizing the direct connection of the flash memory chips, which may be called spatial garbage collection (SpGC). The pnSSD 200A may physically separate paths for performing I/O requests and garbage collection to simultaneously perform the I/O requests and garbage collection, and as a result, reduce the impact of the garbage collection on the I/O, thereby improving the overall performance.

In order to perform the spatial garbage collection, the flash memory chips that process the I/O requests during a certain time interval may be defined as an I/O group, and the flash memory chips that perform the garbage collection during the same time interval may be defined as a GC group. In order to effectively utilize the flash channel bandwidth, the enabled group may be composed of a set of flash memories that exist nearby. For example, in the case of the SSD composed of 16 flash memory chips, 8 chips on one side may be set as the I/O group and 8 chips on the other side may be set as the GC group, and the number of chips included in the group may be adjusted in various ways to efficiently service the I/O requests.

While the I/O group services the I/O requests, the GC group performs the garbage collection through the flash-flash connection, so a physical space for performing the I/O requests and the garbage collection may be separated. By dividing the flash memory chips into the two groups, the I/O requests and the garbage collection are separated, but the I/O requests may still utilize the path diversity by connecting the horizontal channel and the vertical channel.

First, a flash translation layer (FTL) uses all the flash memory chips for the I/O requests, and when the garbage collection starts, the chips in the GC group start copying valid pages to other chips in the GC group. The FTL finds the block from which data needs to move from the chips (sources) in the GC group, and to avoid horizontal channel contention with I/O traffic, the destination may select chips in the same row as the source. When the garbage collection through the vertical channel is completed, all the chips are used again for the I/O requests. When the next garbage collection starts, the FTL may generate the GC group and the I/O group differently from the previous garbage group and perform the garbage collection. This may extend the life of the flash memory.

In the case of the write request, the FTL may completely remove interference between the garbage collection and the write I/O operations by assigning a physical location where data is stored to the I/O group instead of the GC group. In the case of the read request, the interference may occur between the I/O requests and the garbage collection when the corresponding address is in the GC group. To solve this, the size of the GC group may be adaptively reduced. For example, ¼ of all the chips may be set as the GC group, and the remaining chips may be set as the I/O group.

Figure 14A:
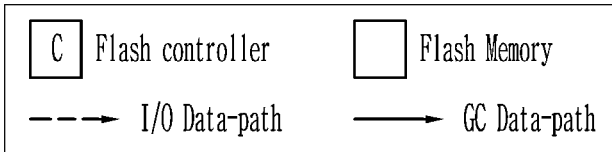
Figure 14A:
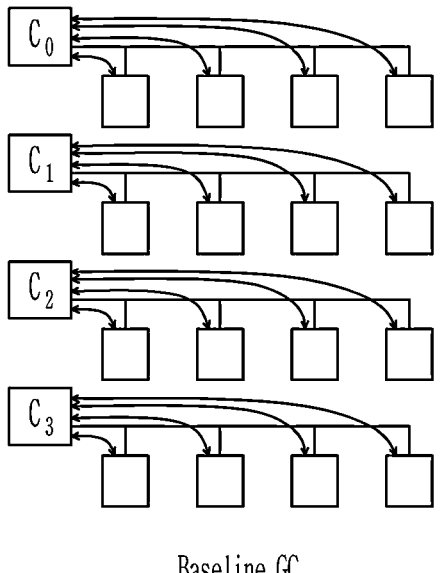
Figure 14B:
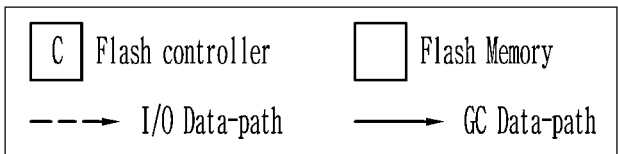
Figure 14B:
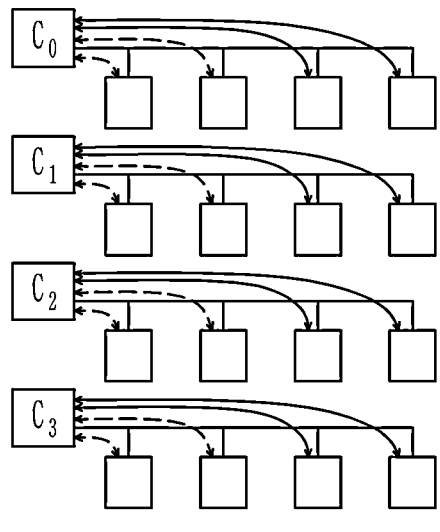

Referring to FIG. 14A, the SSD connected only to the horizontal bus performs the garbage collection in parallel, but may not service the I/O requests during the garbage collection. Referring to FIG. 14B, the SSD connected only to the horizontal bus may separate the garbage collection and the I/O requests, but since the garbage collection and the I/O requests use the same horizontal channel, the interference in the channel is inevitable.

Figure 14C:
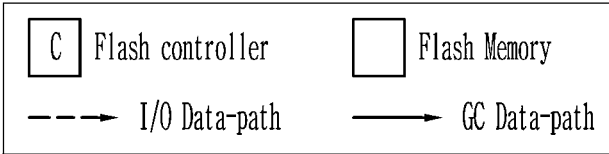
Figure 14C:
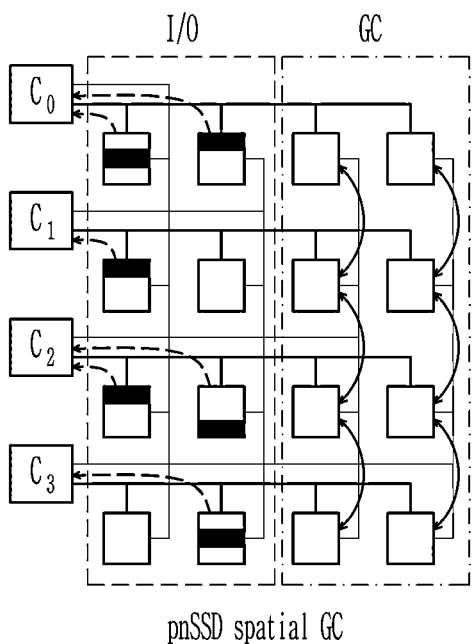

Referring to FIG. 14C, the pnSSD of the present disclosure may separate the I/O requests and the garbage collection by utilizing the vertical channel, and the garbage collection may utilize the vertical channel, so it is possible to minimize the interference in the horizontal channel that services the I/O requests.

Figure 15:
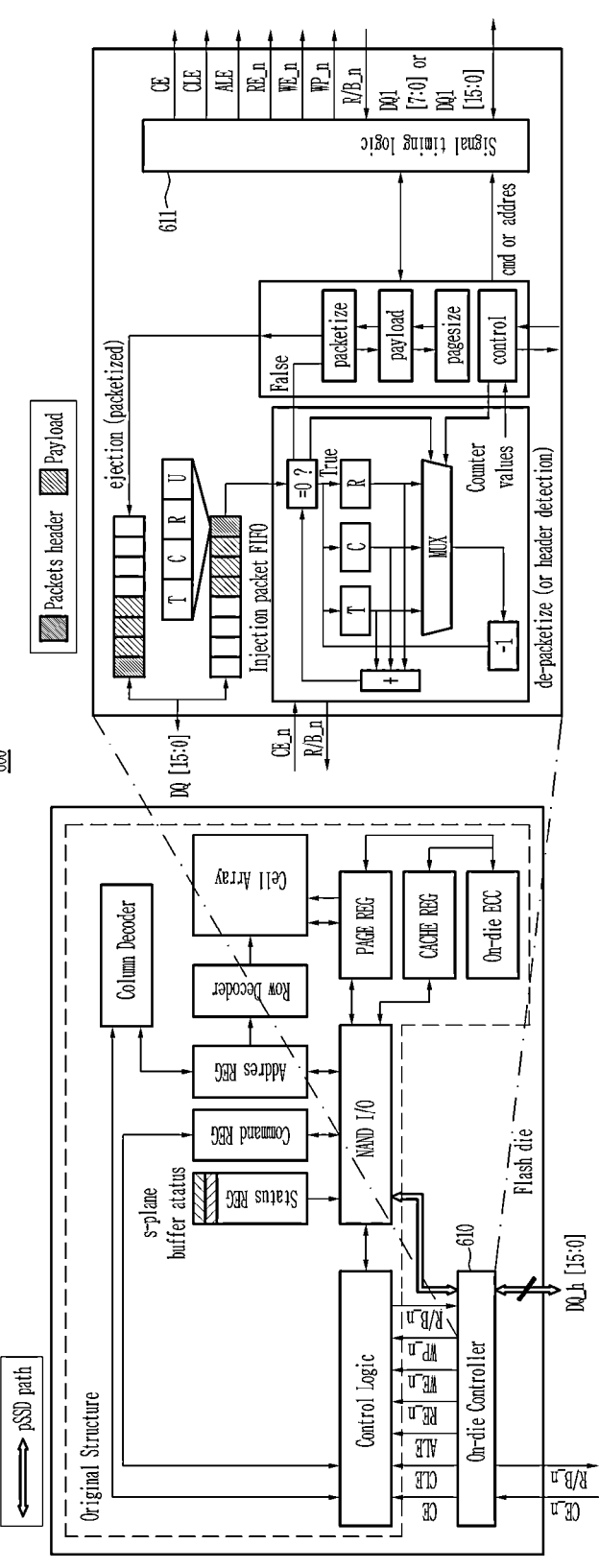
FIG. 15 is an exemplary diagram of flash memory architecture of a pSSD according to an exemplary embodiment.
Figure 16:
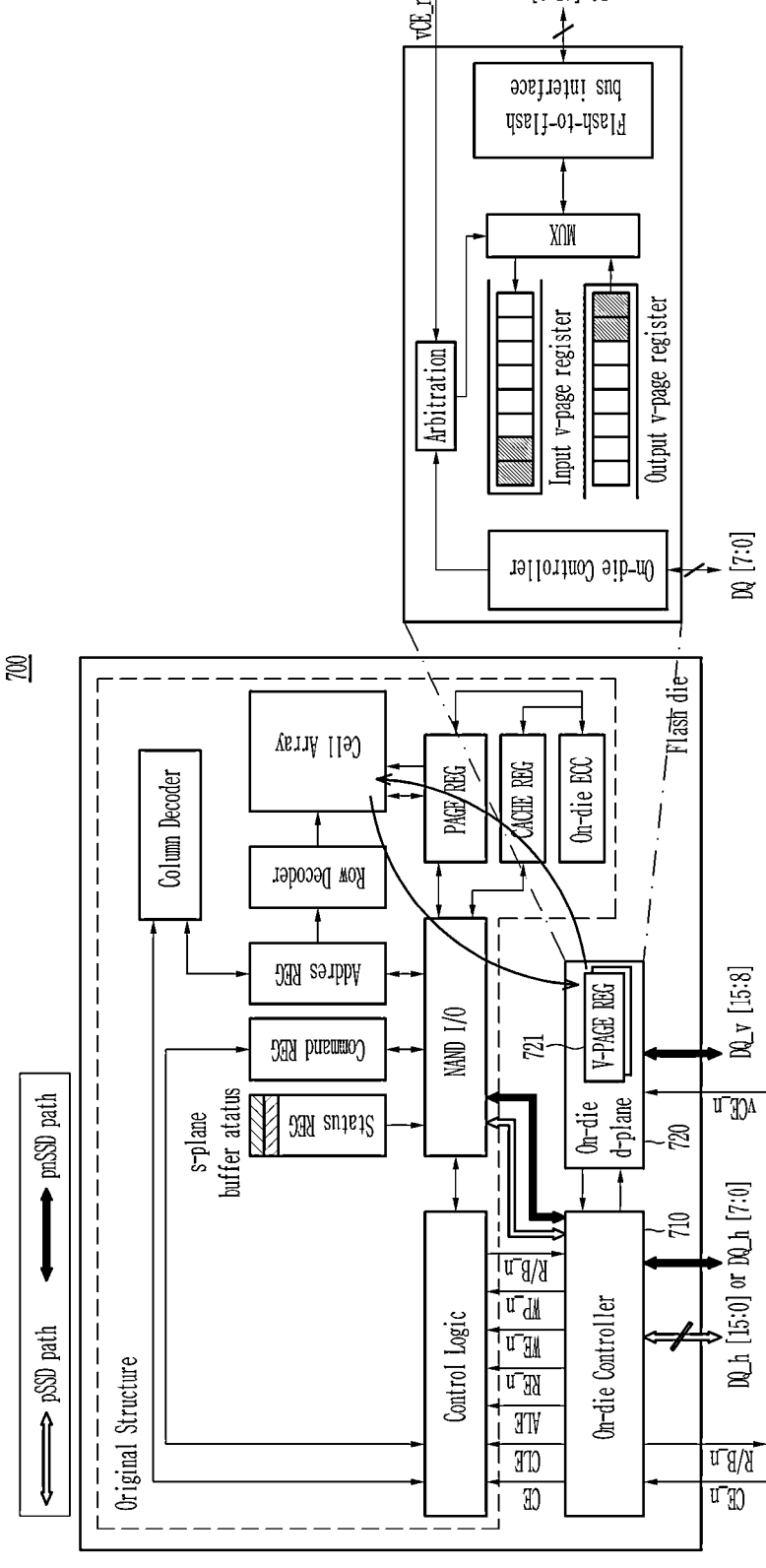
FIG. 16 is an exemplary diagram of flash memory architecture of a pnSSD according to an exemplary embodiment.

FIG. 15 is an exemplary diagram of the flash memory architecture of the pSSD according to an exemplary embodiment. FIG. 16 is an exemplary diagram of the flash memory architecture of the pnSSD according to an exemplary embodiment.

Referring to FIG. 15, in order for the flash memory chip 600 for the pSSD to properly interpret and operate the received packet, the interface between the flash controller and the flash memory chip should be changed. In this case, even if the controller logic is introduced to the interface between the external pin and the internal flash memory, the structure of the internal flash memory may be designed to maintain an original structure (dotted box). The structure of the internal flash memory may be called the original structure as a memory area, for convenience.

The flash memory chip 600 of the pSSD includes hardware logic 610 that is in charge of packet processing in the packet-based interface. The hardware logic 610 may be called the on-die controller.

The input of the on-die controller 610 may be a handshaking pin (CE, R/B) and a DQ pin. The on-die controller 610 may receive a CE signal from the flash controller and transmit an R/B signal to perform the handshaking with the flash controller. The flash memory chip 600 that has received the CE signal is enabled in a usable state. The on-die controller 610 may receive a control packet or a data packet through a horizontal channel DQ_h[15:0] and may transmit a data packet.

The on-die controller 610 may identify the received packet as the control packet or the data packet through the packet type indicator of the packet header. The control packet includes at least one flash command and may further include addresses (column address and row address). The header of the control packet may include a packet type indicator (type, T), the number C of column addresses, and the number R of row addresses. The data packet includes a data payload, and the header of the data packet may include the packet type indicator, the packet direction indicator, the unit of the payload size, and the payload size. The information included in the header may be variable.

The on-die controller 610 may include logics that interpret the packet header to generate the control signal transmitted through the control packet or extract the payload of the data packet and transmits the extracted payload to the inside. In addition, the on-die controller 610 may include logics for packetizing page data and transmitting the packetized page data to the flash channel. The on-die controller 610 may include signal timing logic 611. The on-die controller 610 may store the received packet in an internal FIFO queue and generate a control signal for the flash memory using a state machine according to the received command.

That is, the on-die controller 610 may transmit the command and address received through the packet to the memory area using the same interface as the conventional signal-based flash interface.

For example, the on-die controller 610 may interpret a packet including a read command and generate a read control signal RE_n to apply the read command. According to the read control signal, the read page is stored in a page register PAGE REG, and when the read operation is completed, the on-die controller 610 may read the page data from the page register PAGE REG and transmit the page data by loading the page data into the packet payload.

Referring to FIG. 16, a flash memory chip 700 for the pnSSD includes a on-die controller 710 and may further include an on-die data plane logic 720 for the flash-flash data movement through the vertical channel. The on-die controller 710 includes similar logics as the on-die controller 610 of the pSSD, but the inputs of the on-die controller 710 for the horizontal channel may be the handshaking pins (CE, R/B) and the DQ pin, i.e., DQ_h[7:0].

The inputs of the on-die data plane logic 720 may be a chip enable (vCE_n) pin and a DQ pin, i.e., DQ_v[15:8], in the vertical channel.

The on-die data plane logic 720 may include a page register V-PAGE REG 721 for data movement in the vertical channel. The on-die data plane 720 may provide a path for flash-flash data movement through a vertical channel using the page register V-PAGE REG 721, and may be implemented to act as a switch in packet communication.

For the flash-flash data movement, the flash controller connected to the horizontal channel may read the buffer state through the on-die controller 710, or issue the page transfer (xfer) command to the on-die controller 710. To this end, the on-die controller 710 may check the buffer state of the page register 721 by being linked with the on-die data plane logic 720 or transmit the page transfer command to the on-die data plane logic 720.

Although exemplary embodiments of the present disclosure have been described in detail hereinabove, the scope of the present disclosure is not limited thereto, but may include several modifications and alterations made by those skilled in the art using a basic concept of the present disclosure as defined in the claims.

What is claimed is:

1. A flash-based storage device, comprising:
a flash memory device including a plurality of flash memory chips connected to a plurality of flash buses, and
a storage device controller including a plurality of flash controllers connected to the plurality of flash buses,
wherein the plurality of flash buses form a channel supporting packet communication, and
each flash controller is implemented to generate a control packet including a command or a data packet including a payload, and transmit packets to a target flash memory chip through the connected flash bus, and
wherein each flash memory chip includes a packet-based interface configured to:
identify the control packet or the data packet based on a header of a received packet,
depacketize the control packet to generate a control signal with the command and transmit the control signal to an internal memory area, or
extract the payload included in the data packet and transmit the extracted payload to the internal memory area.

2. The flash-based storage device of claim 1, wherein the control packet includes at least one command, and a column address and a row address related to the command, and
a header of the control packet includes a packet type indicator, the number of column addresses, and the number of row addresses.

3. The flash-based storage device of claim 1, wherein the data packet includes a data payload, and
a header of the data packet includes a packet type indicator, a packet direction indicator, and a payload size.

4. The flash-based storage device of claim 1, wherein any of the plurality of flash controllers transmits the control packet or the data packet to the target flash memory chip after exchanging a handshaking signal to initiate packet communication with the target flash memory chip.

5. The flash-based storage device of claim 4, wherein the handshaking signal includes a chip enable (CE) signal or a ready/busy (R/B) signal.

6. The flash-based storage device of claim 1, wherein the plurality of flash memory chips are connected through a two-dimensional bus structure of horizontal buses and vertical buses.

7. The flash-based storage device of claim 6, wherein each horizontal bus is connected to a corresponding flash controller among the plurality of flash controllers to form a horizontal channel, and
each vertical bus is connected to one of the plurality of flash controllers to form a vertical channel.

8. The flash-based storage device of claim 7, wherein a path is generated for data movement between the flash memory chips through the vertical channel.

9. The flash-based storage device of claim 8, wherein a specific flash controller among the plurality of flash controllers applies a chip enable signal through a vertical bus connecting a source and a destination of the data movement among the plurality of flash memory chips to generate the path, and
the specific flash controller is a flash controller in charge of the vertical bus connecting the source and the destination.

10. The flash-based storage device of claim 7, wherein the plurality of flash memory chips are divided into a first group and a second group, such that while one of the first group and the second group performs garbage collection, the other group services I/O requests.

11. A flash controller connected to a plurality of flash memory chips through a flash bus supporting packet communication, comprising:
flash command control logic generating a control signal for controlling a target flash memory chip among the plurality of flash memory chips;
packetization logic generating the control signal as a control packet or generating a data packet including a payload; and
an interface transmitting packets to the target flash memory chip through the flash bus,
wherein the target flash memory chip includes a packet-based interface configured to:
identify the control packet or the data packet based on a header of a received packet,
depacketize the control packet to generate the control signal with the command and transmit the control signal to an internal memory area, or
extract the payload included in the data packet and transmit the extracted payload to the internal memory area.

12. The flash controller of claim 11, wherein the control packet includes at least one command, and a column address and a row address related to the command, and the header of the control packet includes a packet type indicator, the number of column addresses, and the number of row addresses.

13. The flash controller of claim 11, wherein the data packet includes a data payload, and a header of the data packet includes a packet type indicator, a packet direction indicator, and a payload size.

14. The flash controller of claim 11, wherein the flash bus connects the flash controller and the plurality of flash memory chips through one horizontal bus, or connects the flash controller and the plurality of flash memory chips through a two-dimensional bus structure including one horizontal bus and at least one vertical bus.

15. A flash memory chip connected to a flash bus supporting packet communication, comprising:

a memory area including a flash array;

a packet-based interface, wherein the packet-based interface comprises a controller configured to:

receive a packet transmitted by a first flash controller through a horizontal bus, identify a control packet or a data packet based on a header of the received packet, depacketize the control packet to generate a control signal with a command and transmit the control signal to the memory area, or extract the payload included in the data packet and transmit the payload to the memory area.

16. The flash memory chip of claim 15, wherein the controller is configured to identify the control packet based on a packet type indicator described in the header of the received packet, and generate a command included in the control packet as the control signal through signal timing logic that generates a timing sequence.

17. The flash memory chip of claim 15, wherein the controller is configured to exchange a handshaking signal to start packet communication with the first flash controller.

18. The flash memory chip of claim 15, wherein the packet-based interface further comprises data plane logic connected to the second flash controller and another flash memory chip through the vertical bus, and implemented to provide a data movement path with the other flash memory chip through the vertical bus.

19. The flash memory chip of claim 18, wherein the data plane logic is configured to:

receive a chip enable (CE) signal in a vertical channel formed through the vertical bus from the second flash controller, acquire page data of the other flash memory chip through the vertical channel, or transmit page data to the other flash memory chip through the vertical channel.

* * * * *